(12) United States Patent
Ono et al.

(10) Patent No.: US 7,800,775 B2
(45) Date of Patent: Sep. 21, 2010

(54) DEVICE AND METHOD FOR IMAGE PROCESSING, AS WELL AS DEVICE AND METHOD FOR FILE PREPARATION

(75) Inventors: Koichi Ono, Iwatsuki (JP); Toshimi Shinchi, Matsudo (JP); Tamotsu Sakuraba, Kawasaki (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 1229 days.

(21) Appl. No.: 10/941,096

(22) Filed: Sep. 15, 2004

(65) Prior Publication Data

US 2005/0280837 A1    Dec. 22, 2005

(30) Foreign Application Priority Data

Jun. 17, 2004  (JP) .............................. 2004-179979

(51) Int. Cl.
G06F 15/00 (2006.01)
G06F 3/12 (2006.01)
G06K 15/00 (2006.01)
G06K 15/02 (2006.01)
G06K 1/00 (2006.01)
H04N 1/40 (2006.01)

(52) U.S. Cl. .................... 358/1.18; 358/1.11; 358/1.15; 358/1.16; 358/1.9; 358/3.24; 358/3.28; 715/230; 715/273; 715/965

(58) Field of Classification Search .................. 358/1.1, 358/1.15, 1.13, 1.9, 1.18, 401, 448, 1.16, 358/3.24, 3.28; 715/230, 273, 965
See application file for complete search history.

(56) References Cited

U.S. PATENT DOCUMENTS 5,982,994 A * 11/1999 Mori et al. ................. 358/1.15
6,380,951 B1 * 4/2002 Petchenkine et al. ........ 715/736
6,483,524 B1 * 11/2002 Petchenkine et al. ........ 715/763
6,728,000 B1 * 4/2004 Lapstun et al. ............. 358/1.15
6,825,943 B1 * 11/2004 Barry et al. ................ 358/1.15
6,934,046 B1 * 8/2005 Nishikawa et al. .......... 358/1.15
6,982,801 B1 * 1/2006 Saito ......................... 358/1.15
7,092,117 B2 * 8/2006 Kageyama et al. .......... 358/1.18
7,099,027 B1 * 8/2006 Barry et al. ................ 358/1.15

(Continued)

FOREIGN PATENT DOCUMENTS

JP  7-73167 A  3/1995

(Continued)

OTHER PUBLICATIONS

Official Action issued by the Japanese Patent Office in corresponding Japanese Patent Application No. 2004-179979 on Mar. 23, 2007; and English translation thereof.

(Continued)

Primary Examiner—Twyler L Haskins
Assistant Examiner—Jonathan R Beckley
(74) Attorney, Agent, or Firm—Buchanan Ingersoll & Rooney PC

(57) ABSTRACT

The print controller used as an image processing device analyzes whether any printing setup information is embedded or not in the received PDF file, and sets up the printing condition in accordance with the printing setup information obtained by the analysis.

14 Claims, 9 Drawing Sheets

U.S. PATENT DOCUMENTS

| | | | |
|---|---|---|---|
| 7,136,180 B2 * | 11/2006 | Utsunomiya | 358/1.15 |
| 7,145,679 B2 * | 12/2006 | Hitaka | 358/1.15 |
| 7,148,980 B2 * | 12/2006 | Tominaga | 358/1.15 |
| 7,161,705 B2 * | 1/2007 | Klassen | 358/1.18 |
| 7,173,722 B1 * | 2/2007 | Lapstun et al. | 358/1.15 |
| 7,188,311 B2 * | 3/2007 | Tanaka et al. | 715/248 |
| 7,196,812 B2 * | 3/2007 | Miyata | 358/1.16 |
| 7,203,900 B2 * | 4/2007 | Nara et al. | 715/255 |
| 7,253,919 B2 * | 8/2007 | Hull et al. | 358/1.18 |
| 7,268,907 B2 * | 9/2007 | Sato | 358/1.15 |
| 7,270,918 B2 * | 9/2007 | Blood et al. | 430/10 |
| 7,281,209 B2 * | 10/2007 | Nara et al. | 715/255 |
| 7,283,272 B2 * | 10/2007 | Johnson et al. | 358/1.15 |
| 7,295,333 B2 * | 11/2007 | Sato | 358/1.13 |
| 7,298,503 B2 * | 11/2007 | Christiansen et al. | 358/1.13 |
| 7,301,656 B1 * | 11/2007 | Nakagiri et al. | 358/1.15 |
| 7,340,092 B2 * | 3/2008 | Tanaka et al. | 382/170 |
| 7,400,420 B2 * | 7/2008 | Kageyama et al. | 358/1.13 |
| 7,422,384 B2 * | 9/2008 | Schalk et al. | 400/88 |
| 7,440,126 B2 * | 10/2008 | Hull et al. | 358/1.15 |
| 7,471,401 B2 * | 12/2008 | Saito | 358/1.13 |
| 7,477,409 B2 * | 1/2009 | Yamamura | 358/1.15 |
| 2001/0044868 A1 * | 11/2001 | Roztocil et al. | 710/129 |
| 2002/0080389 A1 * | 6/2002 | Carney et al. | 358/1.15 |
| 2003/0202213 A1 * | 10/2003 | Saito | 358/1.18 |
| 2004/0109191 A1 * | 6/2004 | Ohshima | 358/1.13 |
| 2004/0120011 A1 * | 6/2004 | Double | 358/1.18 |
| 2004/0150853 A1 * | 8/2004 | Stodersching et al. | 358/1.13 |
| 2004/0187081 A1 * | 9/2004 | Petz | 715/526 |
| 2004/0246515 A1 * | 12/2004 | Patton et al. | 358/1.15 |
| 2005/0162667 A1 * | 7/2005 | Felix et al. | 358/1.1 |
| 2005/0280844 A1 * | 12/2005 | Ferlitsch | 358/1.9 |

FOREIGN PATENT DOCUMENTS

| | | |
|---|---|---|
| JP | 2001-344078 | 12/2001 |
| JP | 2004-264440 A | 9/2002 |
| JP | 2003-271331 | 9/2003 |
| JP | 2004-58341 | 2/2004 |

OTHER PUBLICATIONS

Notification of Reason for Rejection dated Jul. 18, 2006, and translation thereof.

* cited by examiner

FIG.12

4 0 obj<</Count 1/Kids[20 0 R]/Type/Pages>>

FIG.13

20 0 obj<</Annots 21 0 R/···

FIG.14

21 0 obj[22 0 R 25 0 R 26 0 R 27 0 R]

FIG.15

N-up = 2in1
Duplex = LeftBinding
Staple = 1-left
Punch = left
Scaling = 50%

FIG.16

N-up = 2in1
Scaling = 50%

FIG.17

Duplex = LeftBinding
Staple = 1-left
Punch = left

DEVICE AND METHOD FOR IMAGE PROCESSING, AS WELL AS DEVICE AND METHOD FOR FILE PREPARATION

This application is based on Japanese Patent Application No. 2004-179979, filed on Jun. 17, 2004, the contents of which are hereby incorporated by reference.

BACKGROUND OF THE INVENTION

1. Field of the Invention

The present invention relates to a device and a method for image processing as well as a device and a method for file preparation. More specifically, the present invention relates to a device and a method for image processing as well as a device and a method for file preparation in case of printing a file directly without converting it to PDL (Page Description Language) data.

2. Description of the Related Art

When a document file is transmitted from a PC (personal computer) to a printer to be printed, the document file is normally converted by a printer driver installed on the PC into a printing data described in a PDL such as PostScript® and is transmitted as a printing job. In this case, a printing setup concerning the document file is prepared by the printer driver and is included in the printing job as a header.

On the other hand, the direct printing is known as a method for transferring a document file directly to a printer for printing without converting it into a PDL data by a printer driver. For example, a technology has been proposed wherein a client device transfers a PDF (Portable Document Format) file directly to a printer for printing using a Web browser (Unexamined Publication No. JP-A-2002-264440). This not only makes the printer driver's processing unnecessary but also alleviates the PC's load.

However, in the direct printing, the printing setup by the printer driver is not performed and the document file is received directly by a printer. Therefore, it has been impossible to conduct a printing setup individually for each document file to be printed. As a result, it has been a problem for the user being unable to adjust the printing setup for each document file, thus being unable to achieve desired printing results in case of direct printing.

SUMMARY OF THE INVENTION

It is an object of the present invention to provide a device and a method for image processing as well as a device and a method for file preparation, which are improved for solving the abovementioned problem.

A more detailed object of the invention is to provide a device and a method for image processing as well as a device and a method for file preparation that provide means of printing under a printing condition the user desires for each file even when the file is to be printed directly without being converted to PDL data by the printer driver.

According to an aspect of the invention, there is provided an image processing device, comprising: a file receiving unit for receiving a file; a file analyzing unit for analyzing whether any printing setup information related to printing condition setup is embedded in said file or not; and a printing setup unit for setting up printing condition in accordance with the printing setup information obtained by said file analyzing unit.

According to this invention, printing can be done under a printing condition the user desires for each file even in direct printing wherein the file is not converted into PDL data by the printer driver and is printed directly. This enables the user to obtain desired printing results.

According to another aspect of the invention, there is provided a file preparation device, comprising: a first input unit for entering printing subject data into a file data that constitutes a file; and a second input unit for entering printing setup information related to printing condition setup concerning said printing subject data into said file data.

According to still another aspect of the invention, there is provided an image processing method comprising the steps of: 1) receiving a file; 2) analyzing whether any printing setup information related to printing condition setup is embedded in said file or not; and 3) setting up printing condition in accordance with the printing setup information obtained in said step 2).

According to a further aspect of the invention, there is provided a file preparation method comprising the steps of: 1) entering printing subject data into a file data that constitutes a file; and 2) entering printing setup information related to printing condition setup concerning said printing subject data into said file data.

The objects, characteristics and properties of this invention other than those set forth above will become apparent from the description given herein below with reference to preferred embodiments illustrated in the accompanying drawings.

BRIEF DESCRIPTION OF THE DRAWINGS

FIG. 12 shows an example of a page synoptic object.

FIG. 13 shows an example of a page object on which information of a page that contains a description indicating that an annotation is included.

FIG. 14 shows an object that describes information concerning an annotation.

FIG. 15 is a diagram showing an example of printing setup information.

FIG. 16 is a diagram showing an example of image processing setup information.

FIG. 17 is a diagram showing an example of printing process setup information.

DETAILED DESCRIPTION OF THE PREFERRED EMBODIMENTS

The embodiments of this invention will be described below with reference to the accompanying drawings.

Figure 1:
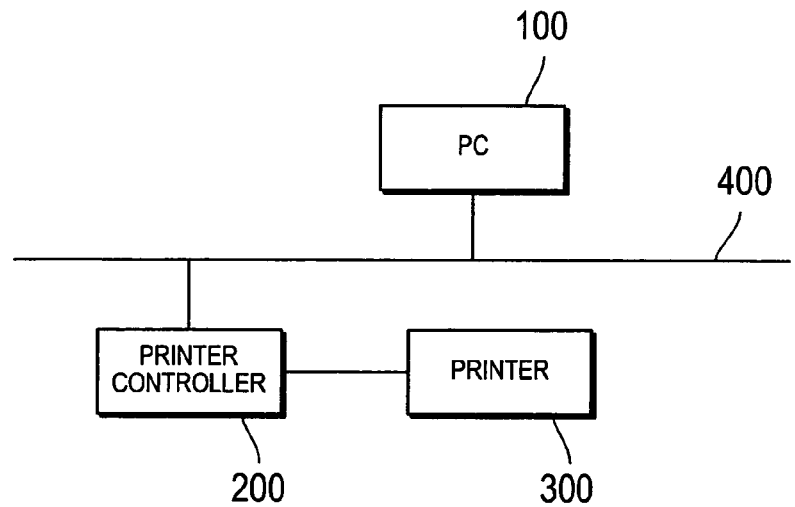
FIG. 1 is a block diagram showing the overall constitution of a printing system.

FIG. 1 is a block diagram showing the overall constitution of a printing system. The printing system shown in FIG. 1 is equipped with a PC (personal computer) 100 used as a file preparation device, a printer controller 200 used as an image processing device, and a printer 300. The PC 100 and the printer controller 200 are communicably connected via a network 400, while the printer controller 200 and the printer 300 are communicably connected directly between them.

Alternatively, the printer controller 200 and the printer 300 can be connected via the network 400 instead of directly between them, while the PC 100 and the printer controller 200 can be connected directly between them instead of via the network 400. Moreover, the types and the number of equipment to be connected to the network 400 are not limited to those shown in FIG. 1.

Figure 2:
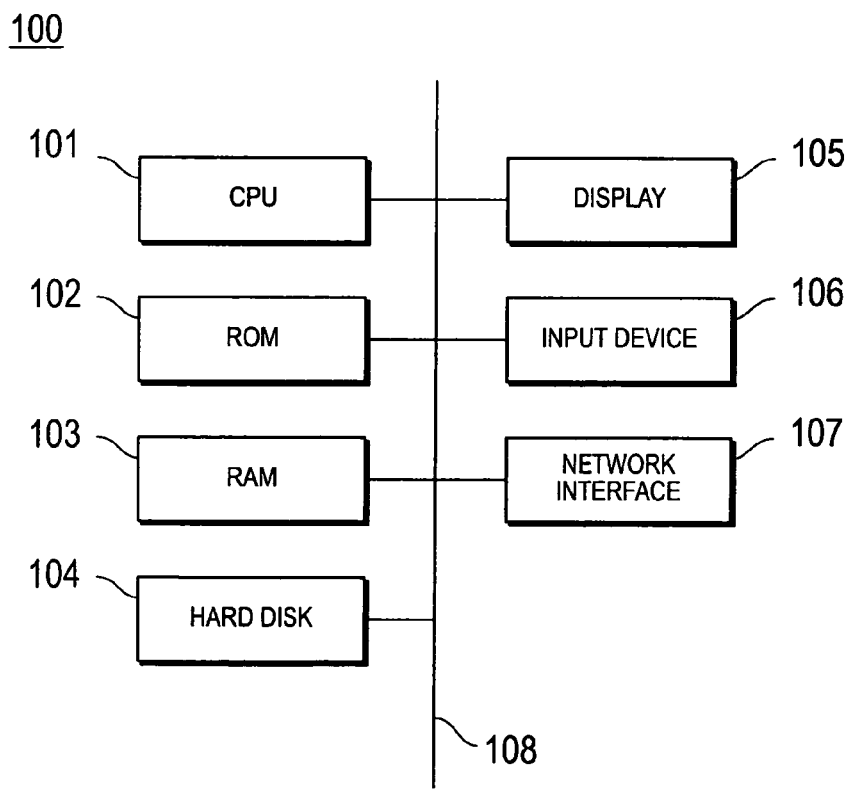
FIG. 2 is a block diagram showing the constitution of a PC.

FIG. 2 is a block diagram showing the constitution of the PC 100. As shown in FIG. 2, the PC 100 contains a CPU 101, a ROM 102, a RAM 103, a hard disk 104, a display 105, an input device 106, and a network interface 107, all of which are interconnected via a bus 108 for exchanging signals.

The CPU 101 controls various parts indicated above and executes various arithmetic processes according to a program. The ROM 102 stores various programs and data. The RAM 103 stores programs and data temporarily as a working area. The hard disk 104 stores various programs including an operating system and various data.

Installed on the hard disk 104 are an application for preparing and editing documents, a printer driver for converting the document file specified by the application into a language that the printer controller 200 can understand (PDL (Page Description Language) such as PostScript®), and a Web browser used for performing operations such as viewing of the status of the printer controller 200 as well as viewing, printing, and modifying of the image data (bitmap data) saved in the printer controller 200. As described later, the PC 100 is capable of transferring a file of a specified format directly to the printer controller 200 without converting the file into a PDL data by means of the printer driver.

The display 105 displays various kinds of information. The input device 106 consists of a pointing device such as a mouse, a keyboard, and others, and is used for making various kinds of inputs.

The network interface 107 is an interface for communicating with other devices via the network 400 using standards such as Ethernet®, Token Ring, FDDI, etc.

Figure 3:
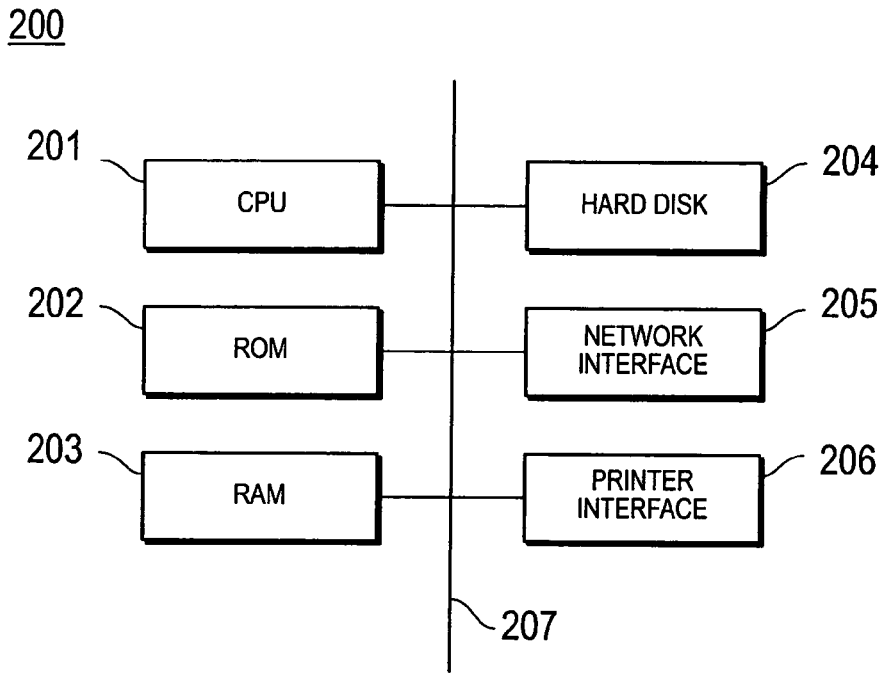
FIG. 3 is a block diagram showing the constitution of a printer controller.

FIG. 3 is a block diagram showing the constitution of the printer controller 200. As shown in FIG. 3, the printer controller 200 contains a CPU 201, a ROM 202, a RAM 203, a hard disk 204, a network interface 205, and a printer interface 206, all of which are interconnected via a bus 207 for exchanging signals. The descriptions of those parts of the printer controller 200 that have the same functions as those of the corresponding parts of the PC 100 will be omitted here to avoid being duplicative.

The hard disk 204 is used for saving the bitmap data supplied to the printer 300 to be printed. Installed on the hard disk 204 also is utility for realizing various operations concerning bitmap data.

The printer interface 206 is an interface for communicating with the printer 300 and a dedicated video interface can be used for it. The printer interface 206 can be either a serial interface such as RS-232C, IEEE 1394, and USB, or parallel interface such as IEEE 1284, or of a proprietary standard.

Figure 4:
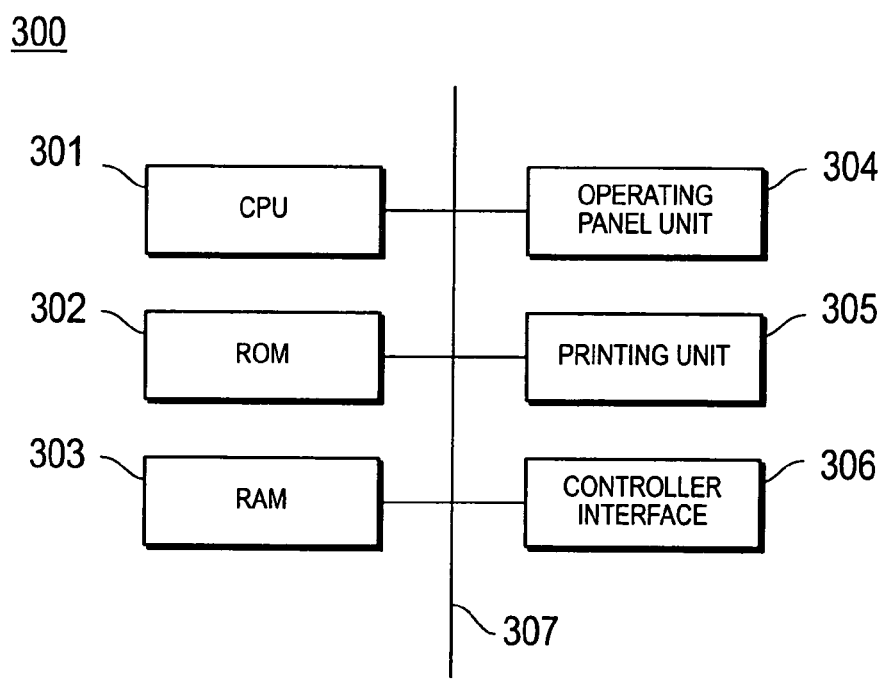
FIG. 4 is a block diagram showing the constitution of a printer.

FIG. 4 is a block diagram showing the constitution of the printer 300. As shown in FIG. 4, the printer 300 contains a CPU 301, a ROM 302, a RAM 303, an operating panel unit 304, a printing unit 305, and a controller interface 306, all of which are interconnected via a bus 307 for exchanging signals. The descriptions of those parts of the printer 300 that have the same functions as those of the corresponding parts of the PC 100 will be omitted here to avoid being duplicative.

The operating panel unit 304 consists of a touch panel, fixed keys, indicator lamps and others provided outside of the touch panel, and is used for various inputting and displaying purposes. The printing unit 305 prints the bitmap data transferred from the printer controller 200 on a recording element such as paper by a printing method such as the electronic photograph method. The controller interface 306 is an interface for communicating with the printer controller 200.

The PC 100, the printer controller 200, and the printer 300 can each contain constitutional elements other than those described above, or may lack a portion of the abovementioned elements.

The operation of the printing system will be described in the following.

In a printing system according to this embodiment, two types of printing, i.e., the normal printing and the direct printing, are executable. If the normal printing is in process, a file to be printed is first converted into print data described in a PDL by the printer driver in the PC 100 and then is transmitted to the printer controller 200. On the other hand, if the direct printing is in process, the file to be printed is transmitted directly from the PC 100 to the printer controller 200 without being converted into a PDL data by the printer driver in the PC 100.

In case of the direct printing, the transmittable file format is limited to the file format that can be developed into bitmap data at the printer controller 200. The direct printing supports various file formats such as PDF (Portable Document Format), TIFF (Tagged Image File Format), PostScript®, and EPS (Encapsulated PostScript®). The direct printing method can further support such file formats as Excel, Word, and PowerPoint®.

A case of direct printing in the present embodiment is described in the following. Moreover, it is a description about a case of the PDF file, which is often used in the direct printing.

Figure 5:
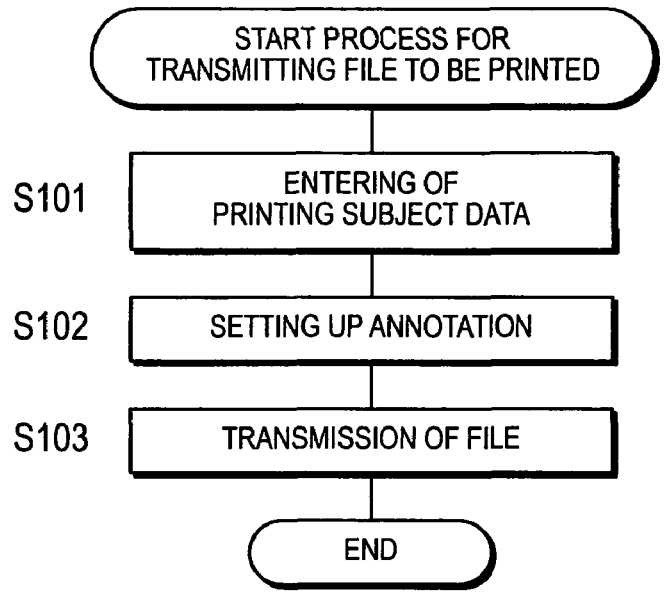
FIG. 5 is a flowchart showing the process procedure in the PC for transmitting a file to be printed.

FIG. 5 is a flowchart showing the process procedure in the PC 100 for transmitting a file to be printed. The algorithm shown in the flowchart of FIG. 5 is stored as a program in a storage unit such as the hard disk 104 of PC 100 and executed by the CPU 101.

Figure 6:
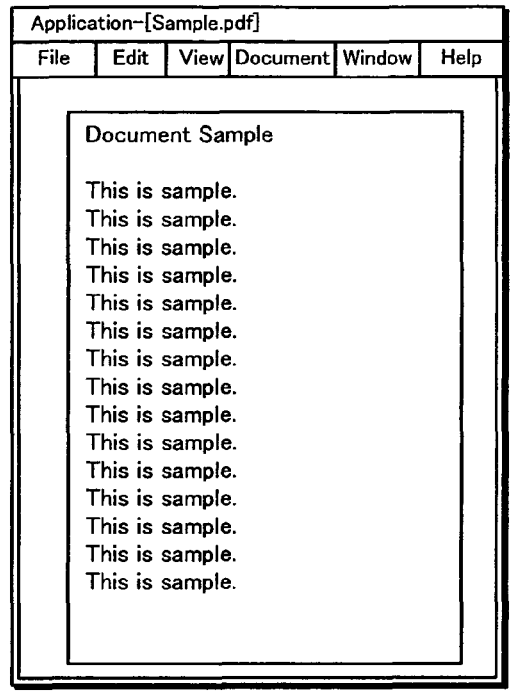
FIG. 6 shows an example status of a PDF file as it is opened when specified printing subject data is entered.

First, a printing subject data is entered into a PDF file data that constitutes a PDF file by means of the preparing/editing application for the PDF file (S101). At this point, the open status of the PDF file, to which the specified printing subject data is entered, is displayed on the display 105 as shown in FIG. 6.

Next, an annotation is set up in the PDF file based on the user's operation (S102). The annotation is additional written information to be embedded into the PDF file. The printing setup information about setting up a printing condition concerning a printing subject data is embedded into a PDF file as an annotation by the editing application. The PDF file has an annotation function (Note Tool) for setting up an annotation as a standard feature.

Figure 7:
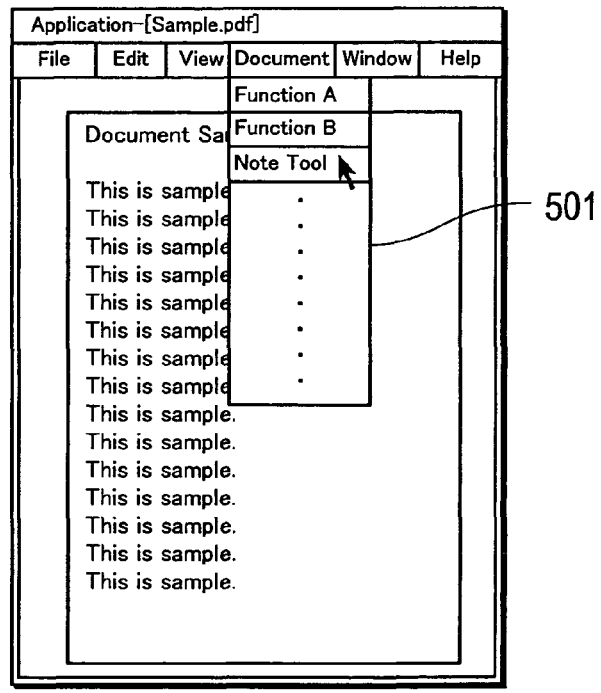
FIG. 7 shows an example condition wherein an annotation function of a PDF file is selected.
Figure 8:
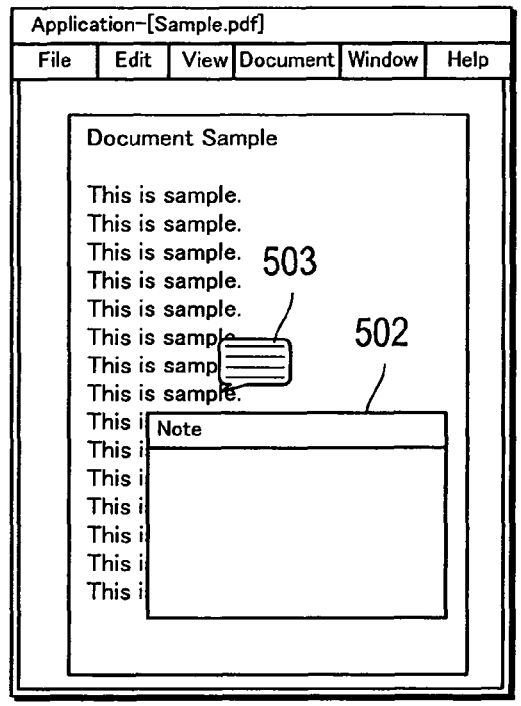
FIG. 8 shows an example condition wherein a screen for editing the contents of an annotation is displayed.
Figure 9:
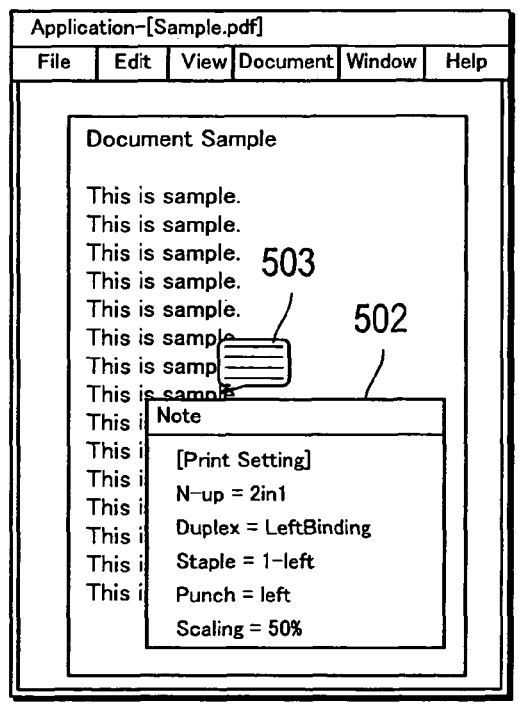
FIG. 9 shows an example of printing setup information written on a popup window as a part of the contents of an annotation.

FIG. 7 shows an example condition wherein an annotation function of a PDF file is selected. As shown in FIG. 7, an annotation function is selected from a pull-down menu 501. FIG. 8 shows an example condition wherein a screen for editing the contents of an annotation is displayed. As shown in FIG. 8, a popup window 502 for entering the contents of the annotation and a note icon 503 for indicating the existence of the annotation are displayed. At this point, the user can write the printing setup information in the popup window 502. FIG. 9 shows an example of printing setup information written on the popup window 502 as a part of the contents of an annotation. The description format of the printing setup information is defined by the design developer of the printer controller 200 so that the printer controller 200 can understand.

The prepared PDF file is then transmitted to the printer controller 200 (S103). More specifically, the prepared file is transferred to an open folder (or open queue) established in a storage unit such as the RAM 203 in the printer controller 200. Various transfer methods can be used in this case such as a data transfer by means of SMB (Server Message Block) communication via the network 400, a data transfer by means of FTP (File Transfer Protocol) communication via the network 400, a data transfer using a recording medium such as a CD (Compact Disc) or MO (Magneto Optical Disk), and a data transfer as an attachment to an electronic mail message.

Figure 10:
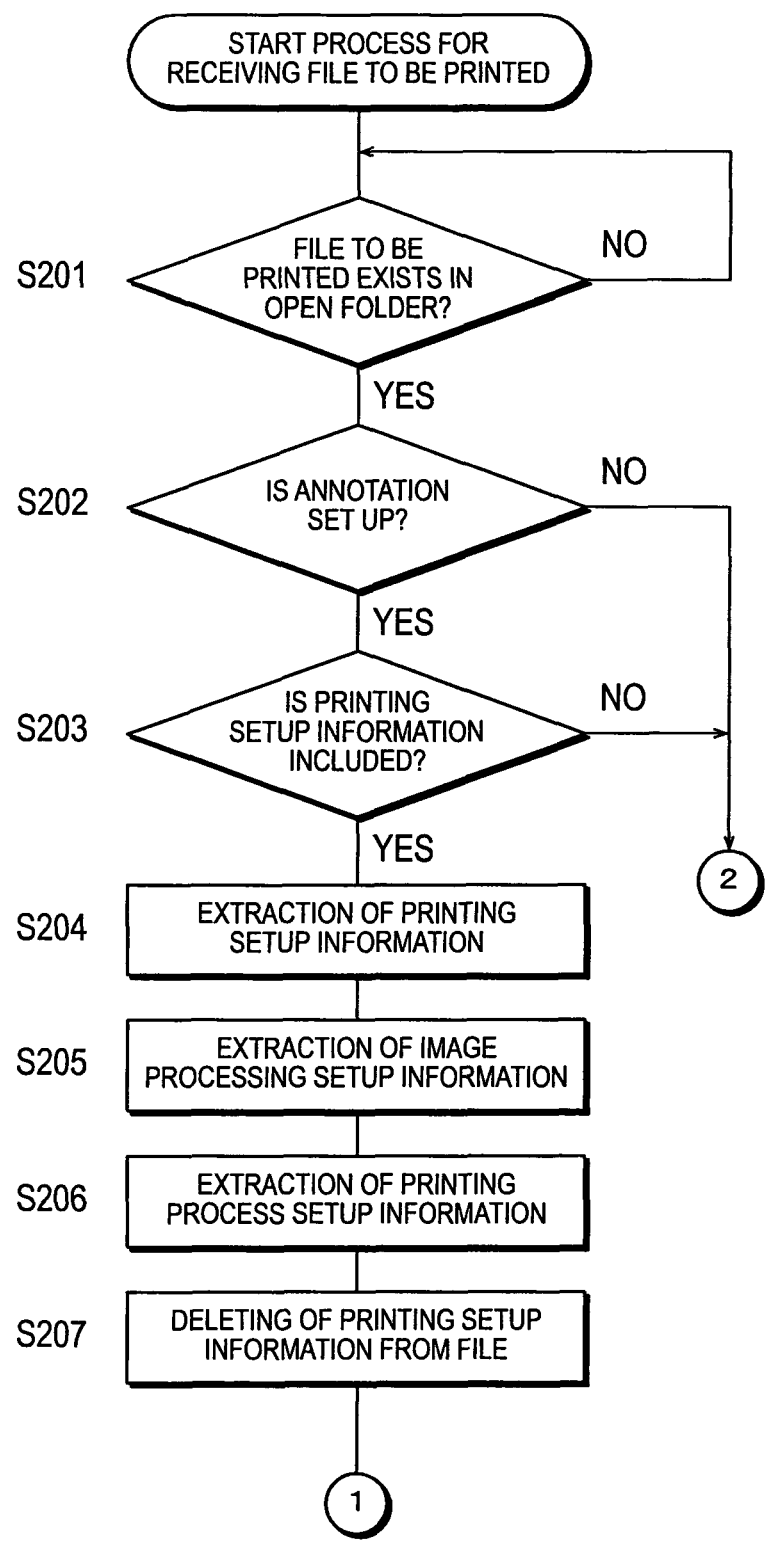
FIG. 10 is a flowchart showing the process procedure in the printer controller for receiving a file to be printed.
Figure 11:
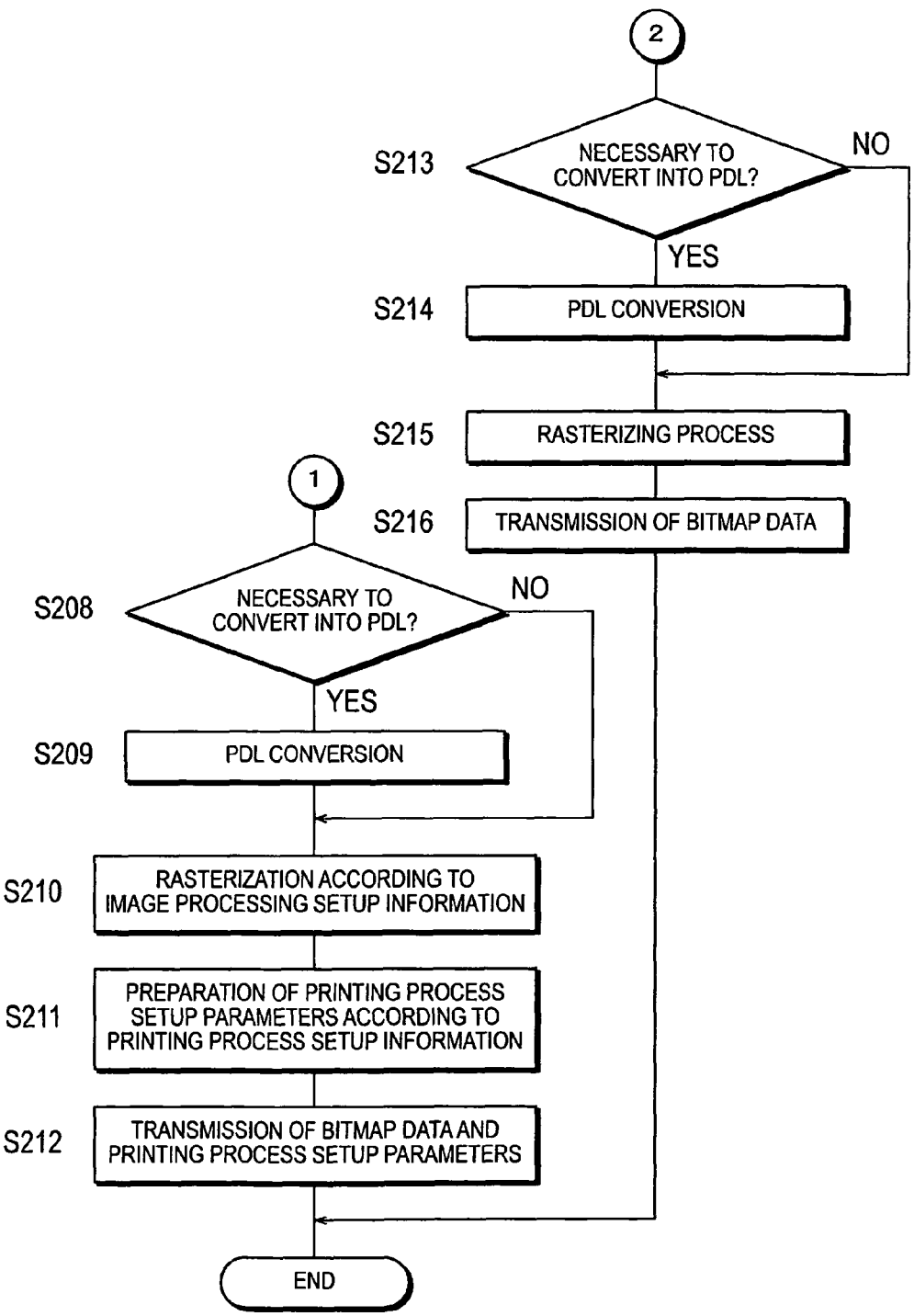
FIG. 11 is a flowchart continuing from FIG. 10 showing the process procedure in the printer controller for receiving a file to be printed.

FIG. 10 and FIG. 11 are flowcharts showing the process procedure in the printer controller 200 for transmitting a file to be printed. The algorithm shown in the flowchart of FIG. 10 and FIG. 11 is stored as a program in a storage unit such as the hard disk 204 of the printer controller 200 and executed by the CPU 201.

First, the printer controller 200 makes a judgment as to whether the PDF file to be printed exists in the open folder or not (S201). In other words, a confirmation is performed regularly as to whether the PDF file to be printed, which is received from the PC 100 for example, exists in the open folder or not. If the PDF file does not exist in the open folder (S201: No), it stands by until the PDF file is reserved anew in the open folder.

If it is judged that the PDF file exists in the open folder (S201: Yes), a judgment is made as to whether an annotation is set up on said PDF file (S202). If no annotation is set up (S202: No), the process advances to step S213.

The method of judging whether an annotation is set up or not is described in the following. First, it detects a page synoptic object where information of each page is described from the objects described in the PDF file. The page synoptic object is an object where "/Type/Pages" are described in the PDF file. The objects mentioned here are individual elements that constitute a document. FIG. 12 is a diagram showing an example of page synoptic object. In the case shown in FIG. 12, it can be seen that the total number of pages is 1 from the description of "/Count 1" and that the information on the first page is described in "object 20" from the description of "/Kids [20 0 R]. Based on this information, it can be judged whether there is or not a description of "/Annots" which is indicative of the fact that an annotation is included in the object 20. FIG. 13 shows an example of a page object on which information of a page that contains a description indicating that an annotation is included.

If it is judged that an annotation is set up in the step S202 (S202: Yes), a judgment is made as to whether a printing setup information is included or not in the descriptive part of said annotation (S203). If no printing setup information is included (S203: No), the process advances to step S213.

The method of judging whether printing setup information is included or not is described in the following. First, the number following "/Annots" (21 in case of the example shown in FIG. 13) is detected among the page objects shown in FIG. 13. The number following "/Annots" shows the number of the object describing the information concerning the annotation. FIG. 14 shows an object that describes information concerning an annotation. In the case shown in FIG. 14, it can be seen that two annotations are set up. In other words, "22 0 R 25 0 R" defines one annotation, while "26 0 R 27 0 R" defines another annotation. In case of the "22 0 R 25 0 R" description, the contents of the annotation are described in the "object 22" while the displaying location and the layout of the annotation are described in the "object 25." The contents of the annotation are described within the parentheses "/Contents ( . . . )" of the object 22. A judgment is made as to whether any printing setup information of the specified description format is included or not in the description within the parentheses following "/Contents."

If it is judged that printing setup information is included in the step S203 (S203: Yes), the printing setup information is extracted from the descriptive part of said annotation (S204).

FIG. 15 is a diagram showing an example of printing setup information. In FIG. 15, the description of "N-up=2 in 1" is instruction information for setting up the N-up function for laying out N pages of data into one page of output data wherein N is specified as 2. The description of "Duplex =Left-Binding" is instruction information for dual side printing, specifying dual side printing with left side binding in this case. The description of "Staple=1-left" is instruction information for a stapling process, specifying one point on the left side of the paper to be bound in this case. The description of "Punch=left" is instruction information for the punching process, specifying holes to be punched on the left side of the paper in this case. The description of "Scaling=50% " is instruction information for enlarging or reducing the size, specifying a reduction to a 50% size in this case. The items of the printing setup information is not limited to the above items, but rather it can include other items such as a number of copies to be printed or a paper size to be used.

Next, image processing setup information is extracted from the printing setup information obtained by extraction (S205). In other words, the setup information concerning the image processing is extracted from the printing setup information. For example, the image processing information shown in FIG. 16 is extracted from the printing setup information shown in FIG. 15. However, a part of the image process, such as the processing for the N-up function can be executed by the printer 300. In this case, a part of the setup information such as the processing for the N-up function is not extracted as the image processing setup information but is extracted as the printing process setup information, which will be described later.

Next, printing process setup information is extracted from the printing setup information obtained by extraction (S206). In other words, the setup information concerning the printing process to be executed by the printer 300 is extracted from the printing setup information. For example, the printing process information shown in FIG. 17 is extracted from the printing setup information shown in FIG. 15.

Moreover, the printing setup information is deleted from the PDF file (S207). This makes it possible to prevent the annotation describing the printing setup information from being accidentally printed out.

If normal sentences other than the printing setup information are described in the descriptive part of the annotation, only the description of said printing setup information is deleted. More specifically, the descriptive part that corresponds to the printing setup information is deleted from the parentheses following the "/Contents" in the object in which the contents of the annotation are described.

Also, if only the printing setup information is described in the annotation description part, the annotation itself is deleted. More specifically, the annotations is deleted in the following procedure. First, the object in which the contents of the annotation are described will be deleted. Next, the object in which the display position and the layout information of the annotation are described will be deleted. Next, the object in which the information concerning the annotation is described (FIG. 14) will be deleted. However, if there is any description concerning an annotation that is not related to the printing setup information is contained in the object in which the information concerning the annotation is described, only the description concerting an annotation containing the printing setup information will be deleted. For example, if the description of "22 0 R 25 0 R" shown in FIG. 14 is about an annotation containing the printing setup information and the description of "26 0 R 27 0 R" is about an annotation unrelated to the printing setup information, only the description of "22 0 R 25 0 R" will be deleted. When all the objects describing the information concerning the annotation are deleted, the description "/Annots" will be deleted from the page object (see FIG. 13) of its linking source. Lastly, the Cross-Reference Table, reference information concerning the location of the object, which follows "xref" in the PDF file is updated.

In step S208, a judgment is made as to whether the received file is a file that needs to be converted into a PDL data or not. If it is a file that is not necessary to be converted into a PDL data (S208: No), the program advances to step S210. For example, if it is a PDF file, which is used for explaining the present embodiment, there is no need to convert it into a PDL data. On the other hand, if it is necessary to convert it into a PDL data (S208: Yes), the received file is converted into a specified PDL data (S209). For example, if a file such as an Excel, Word, or PowerPoint® file, is directly received, the particular file is converted into a PDL data.

In the step S210, a rasterizing process is applied to the received PDF file in accordance with the image processing setup information obtained in the step S205. In other words, a bitmap data is obtained by developing the PDF file in accordance with the image processing setup information. For example, if the image processing setup information shown in FIG. 16 is obtained, the 2-up process for laying out the two page amount of data into one page of output data, and a rasterizing process for reducing the size by 50% are executed.

Next, printing process setup parameters that the printer 300 can understand concerning the printing process are prepared (S211), based on the printing process setup information obtained in the step S206. The printer controller 200 transmits the bitmap data obtained in the step S210 and the printing process setup parameters obtained in the step S211 to the printer 300 (S212).

On the other hand, if it is judged that no annotation is setup in the step S202 (S202: No), or that no printing setup information is contained in the step S203 (S203: No), a rasterization process is applied to the received file under the basic condition (S215) after the file is converted to a PDL data as needed (S213, S214). The processes in the steps S213 and S214 are identical to the steps S208 and S209 already described. The bitmap data obtained by the rasterization process is transmitted to the printer 300 (S216).

Figure 18:
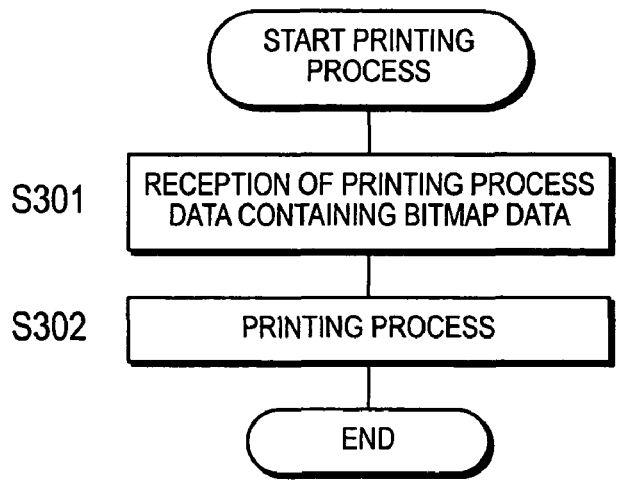
FIG. 18 is a flowchart showing the printing process procedure in the printer.

FIG. 18 is a flowchart showing the printing process procedure in the printer 300. The algorithm shown in the flowcharts of FIG. 18 is stored as a program in a storage unit such as a ROM 302 of the printer 300 and executed by the CPU 301.

First, the printer 300 receives printing process data containing bitmap data from the printer controller 200 (S301). The received bitmap data is printed by the printing unit 305 on a recording medium such as paper (S302). If the printing process data contains the printing process parameters, the printer 300 executes the printing process in accordance with the printing process setup parameters. For example, if the printing process setup parameters corresponding to the printing process setup information indicated in FIG. 17 are obtained, the printer 300 performs the printing processes containing the process of the dual side printing for the left side binding, the process for binding one point on the left side of the paper, and the process of punching holes on the left side of the paper.

Thus, according to the present embodiment, the printer controller 200 analyzes whether any printing setup information is embedded or not in the received PDF file, and sets up the printing condition in accordance with the printing setup information obtained by the analysis.

Therefore, it allows us to print a PDF file under a printing condition the user desires for each PDF file even in direct printing wherein the file is transferred directly to the printer controller 200 without being converted into a PDL data by the printer driver. This enables the user to obtain desired printing results even in case of direct printing.

It is obvious that this invention is not limited to the particular embodiments shown and described above but may be variously changed and modified without departing from the technical concept of this invention.

For example, although the printer controller 200 is provided as an image processing device separate from the printer 300, the present invention is not limited to it. The printer controller 200 can be included in the printer 300. Therefore, an image processing device according to the present invention is applicable to printing devices such as a copying machine, an MFP (Multi-Function Peripheral), etc.

Also, although a PC is used as the file preparation device of the invention in the abovementioned embodiment, the invention is not limited to it and other devices such as a portable terminal or a dedicated device can be used for the same purpose.

Also, although the annotation function (Note Tool) is used as a means of embedding the printing setup information in the PDF file in the abovementioned embodiment, the invention is not limited to it and other functions such as a text box function for writing texts in the text box can be used for the same purpose.

Moreover, although a case of directly printing a PDF file is described in the above embodiment, the present invention is not limited to it. The invention can be applied to a case of directly printing files of other formats wherein printing setup information can be embedded. For example, a Word file can be used. In such a case, the printing setup information can be embedded in the file by means of the comment function for inserting comment texts.

The means and method of conducting various processes in the printing system according to the present invention can be realized by means of a dedicated hardware circuit, or a programmed computer. Said program can be provided either by a computer readable recording medium such as a flexible disk and a CD-ROM, or by being supplied on-line via a network such as the Internet. In this case, the program recorded on the computer readable recording medium is normally transferred to and stored in a storage unit such as a hard disk. Said program can also be provided as independent application software or can be built into the software of the device as a part of its function.

What is claimed is:

1. An image processing device, comprising:
    a file receiving unit for receiving a file to be printed;
    a file analyzing unit for analyzing whether any printing setup information related to printing condition setup is embedded in said file or not; and
    a printing setup unit for setting up printing condition in accordance with the printing setup information obtained by said file analyzing unit wherein the printing condition setup is embedded in the file to be printed by one of annotation, text box and comment functions.

2. An image processing device as claimed in claim 1, wherein
    said file is a data for displaying on a display device.

3. An image processing device as claimed in claim 1, wherein
    said file is a data that is obtained by a document preparation application program and is not converted into a printing data.

4. An image processing device as claimed in claim 1, wherein
    said file is a PDF file.

5. An image processing device as claimed in claim 1, further comprising
    a printing unit for printing the file based on the printing condition set up by said printing setup unit.

6. An image processing device as claimed in claim 5, further comprising
    a printing setup information deleting unit for deleting the printing setup information from the file when the printing setup information is embedded in the file, wherein
    said printing unit prints the file after the printing setup information has been deleted.

7. An image processing device as claimed in claim 1, wherein
    said printing setup information includes instruction information for laying out N pages of data into one page output data.

8. An image processing device as claimed in claim 1, wherein
    said printing setup information includes instruction information for dual side printing.

9. An image processing device as claimed in claim 1, wherein
    said printing setup information includes instruction information for stapling process.

10. An image processing device according to claim 1, wherein the file to be printed is a file created by a document creation application.

11. An image processing method comprising the steps of:
    1) receiving a file to be printed;
    2) analyzing whether any printing setup information related to printing condition setup is embedded in said file or not; and
    3) setting up printing condition in accordance with the printing setup information obtained in said step 2) wherein the printing setup information is embedded in the file to be printed by one of annotation, text box and comment functions.

12. An image processing method as claimed in claim 11, further comprising the step of
    4) printing the file based on the printing condition set up in said step 3).

13. An image processing method as claimed in claim 12, further comprising the step of
    5) deleting the printing setup information from the file when printing setup information is embedded in the file, wherein
    said step 4) is for printing the file after the printing setup information has been deleted.

14. An image processing device according to claim 11, wherein the file to be printed is a file created by a document creation application.

* * * * *